United States Patent

[11] 3,562,629

| [72] | Inventor | Michel Troubetzkoi |
| | | 3660 Peel St, Montreal, Quebec, Canada |
| [21] | Appl. No. | 710,176 |
| [22] | Filed | Mar. 4, 1968 |
| [45] | Patented | Feb. 9, 1971 |

[54] TUBE FILLED WITH IONIZED GAS FORMING A RESISTOR-CAPACITOR UNIT
3 Claims, 5 Drawing Figs.

[52] U.S. Cl.................................................. 323/74,
313/201, 317/244
[51] Int. Cl.................................................. G05f 3/00
[50] Field of Search.......................................... 313/201,
226, 234; 317/244; 323/74, 93; 324/111, 126

[56] References Cited
UNITED STATES PATENTS

| 2,395,623 | 2/1946 | Goldstein et al............ | 324/111X |
| 2,613,345 | 10/1952 | Osterland.................... | 324/126X |
| 3,336,493 | 8/1967 | Lambert...................... | 313/201X |
| 1,758,516 | 5/1930 | Hendry........................ | 313/201 |
| 2,051,623 | 8/1936 | Tonks.......................... | 313/201 |
| 2,159,824 | 5/1939 | Spanner...................... | 313/201X |
| 2,202,101 | 5/1940 | Hasler et al.................. | 313/201X |
| 3,209,285 | 9/1965 | Manwarren et al........... | 313/201X |

Primary Examiner—James D. Trammell
Assistant Examiner—A. D. Pellinen
Attorney—Pierre Lesperance ABSTRACT: A capacitor unit for use as a tension reducer and consisting of a tube filled with ionizable gas and provided with electrodes at its two ends for connection to a source of high voltage, at least one of the electrodes being an external electrode so as to form one conductive surface of a condenser, the dielectric of the condenser being formed by the wall of the tube and the other conductive surface of the condenser being formed by the gas inside the tube when ionized, the ionized gas forming also a resistive path to the other electrode whereby the tension reducer forms at least one capacitor and one resistor element in series. The unit is more particularly adapted for use in combination with measuring instrument for measuring high voltage.

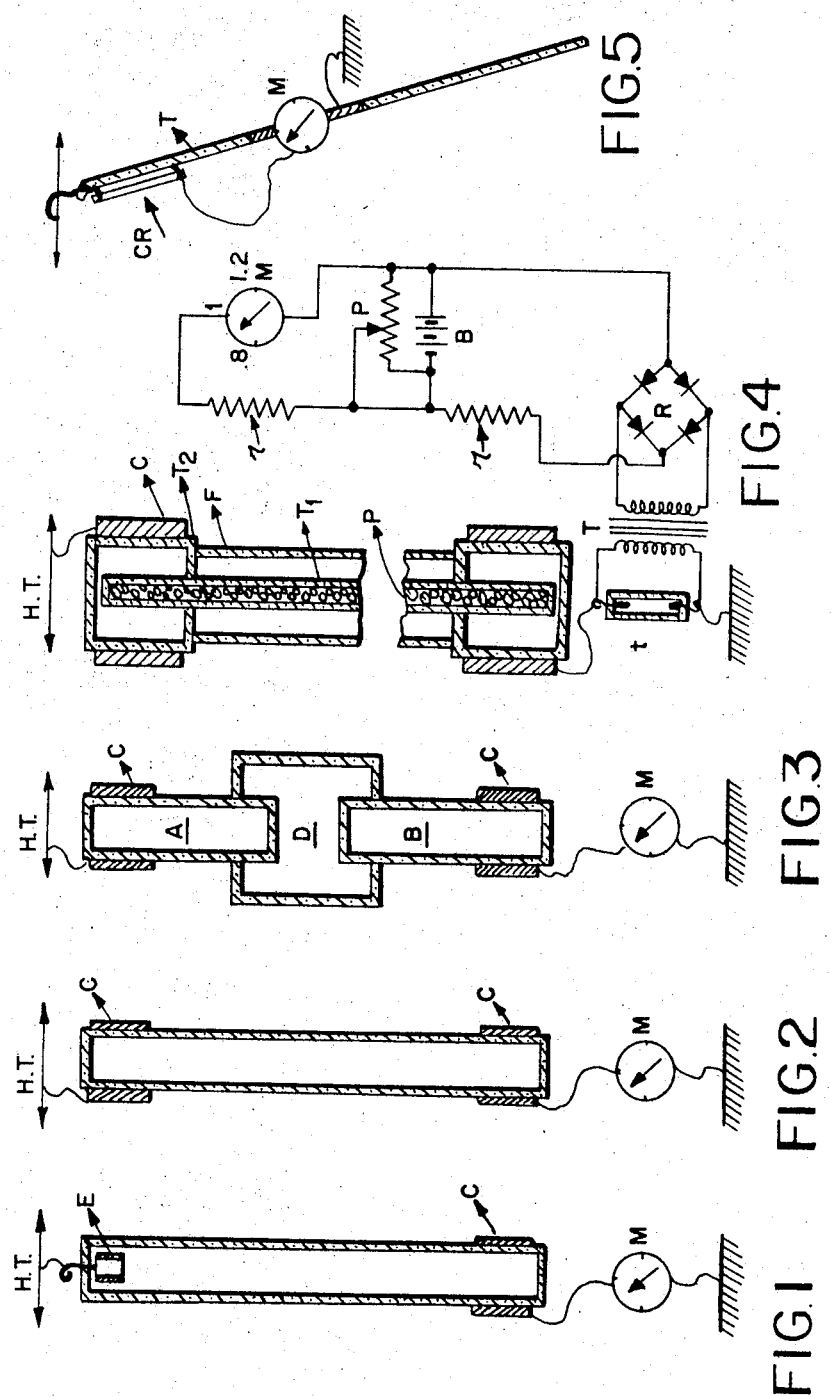

TUBE FILLED WITH IONIZED GAS FORMING A RESISTOR-CAPACITOR UNIT

The present invention relates to a resistor-capacitor unit for use as a tension reducer in high voltage circuits and, more particularly, for use in measuring the voltage of high tension transmission lines and the like.

The purpose of the invention is to provide additional security, greater stability and a more accurate telemetering of the voltage measuring apparatus.

Whenever high or very high tension measuring has to be effected, the following primary difficulties arise:
1. the Corona effect;
2. insulating and its overheating.

All the methods that are now being used to measure high and very high tensions, even such new methods as the magneto- and electro-optical, have adopted tension reducers. Such reducers are equipped with coils, capacitors or resistors connected in series. But there exists a very important drawback: an impaired element is liable to cause a partial short circuit which may eventually develop and damage the entire apparatus and also cause additional unforeseen damage.

The use of a combined resistor and condenser formed by a gas tube will eliminate such drawbacks. It can remain connected for an indefinite length of time without any supervision. If one of the elements is damaged, the circuit is automatically cut off and even a partial short circuit is definitely avoided. As a result, the proposed device can remain connected and give a permanent, telemetered reading.

In the drawings:

FIGS. 1 to 4 show, in longitudinal section, four embodiments of the invention.

FIG. 5 shows, in perspective, another application of the invention.

Those different types of resistor-capacitor units are based on the principle of gas ionization. By its nature, gas is an insulator but, once ionized, it becomes conductive to a certain degree and can therefore be used both as the conductive surface or plate of a condenser and as a resistive path between the terminals of the unit.

FIG. 1 shows a closed glass tube filled with ionizable gas and bearing at one end an internal electrode E of a standard type, available on the market, and at the other end an external electrode C, made of conductive material and surrounding the surface of the tube. Collar-shaped electrode C fits around the tube and is isolated from the gas by the insulating wall of the tube.

Internal electrode E is connected to a conductor extending outside the tube and serving as a high tension terminal adapted to be directly connected to a high tension wire HT. Collar-shaped electrode C is adapted to be connected to a voltage measuring apparatus M, also adapted to be grounded at its other terminal. High voltage applied to the gas will cause ionization of the gas inside the tube. The portion of the gas opposite collar-shaped electrode C forms a conductive surface for a condenser consisting of collar C as a first condenser plate; the gas conductive surface as a second condenser plate; and the wall of the glass tube opposite collar C as the dielectric of the condenser. The ionized gas inside the tube between electrode E and the condenser at the other end of the tube forms a resistive path for the electricity, whereby the system forms a series-connected resistor and capacitor element, acting as a tension reducer. The resistance of the ionized gas inside the tube and which forms the resistive path does not follow Ohm's law. This resistance is not only subjected to the section and length of the tube but also to the current which passes through it. For weak currents below about 1 milliamperes, the voltage drop across the gas, that is from electrode E to the condenser element at the opposite end of the tube, is of the same order as the drop across the capacitive part of the unit. Thus, the unit of FIG. 1 has about twice the resistance of a conventional unit wherein two internal electrodes, such as electrode E, would be provided at the ends of the tube filled with ionizable gas. Of course, the resistivity of the ionized gas will be determined by the type of gas used. Also, a mixture of different gases can be used; for instance, neon, argon and xenon.

FIG. 2 shows a tube with two external electrodes C. From an electrical point of view, this device is comparable to two condensers and an intervening resistor connected in series. The resistor element is constituted by the ionized gas within the tube from one end to the other end of the tube. Each condenser element comprises the respective collar C as one condenser plate; the gas opposite the collar C as the second condenser plate; and the wall of the tube adjacent the collar C as the dielectric; for the same tube length as in FIG. 1, the total resistance across the unit of FIG. 2 should be one and a half times the total resistance of the unit of FIG. 1.

FIG. 3 shows tubes A and B partially inserted into a wider tube D and soldered to it. At the outer end of each tube A and B is a capacitive collar C. All these tubes contain a gas ionized by the voltage applied to the external electrodes formed by collars C.

Thus the device forms a quadruple condenser:
a. The first condenser is formed by the conductive surface of the capacitive collar, the dielectric formed by the wall of the tube A and the other capacitive surface formed by the ionized gas in tube A.
b. The second condenser is formed by the conductive surfaces of the ionized gas in tubes A and D separated by the insulating wall of tube A which forms the dielectric of the condenser.
c. The third condenser is formed by the conductive surfaces of the ionized gas in tubes D and B separated by the dielectric formed by the insulating wall of tube b.
d. The fourth condenser is formed by the conductive surface of the ionized gas in tube B and by the capacitive collar separated by the dielectric B formed by the wall of tube B.

FIG. 4 shows the same principle as in FIG. 3, featuring a quadruple condenser with intervening resistance elements. A very narrow tube $T_1$ connects two tubes $T_2$ of a large diameter filled with ionizable gas and equipped with capacitive collars C. The tube $T_1$ and the two tubes $T_2$ are filled with ionizable gas. The resistance of the ionized gas in tube $T_1$ may be raised considerably by inserting glass beads P into the tube $T_1$.

Actually this device is a tension reducer combining series-connected capacitor and resistor elements as it comprises:
a. four condensers connected in series;
b. resistors formed by an ionized gas in tubes $T_1$ and $T_2$ with a resistance increased by:
   1. narrowing the section of the tube $T_1$;
   2. introducing glass beads into the gas tube $T_1$.

In order to increase the mechanical resistance of the device, we may place the reducer inside a protective tube F. The tube F firmly holds the ends of tubes $T_2$ in position and is soldered to the base of these tubes $T_2$.

The resistance of gas tubes may vary under the influence of temperature, and in order to avoid such variations, we have provided a temperature compensator.

An automatic temperature error compensator is conceived as follows: the reducer is connected in series to a small tube $t$, filled with the same gas, having the same pressure as in tube $T_1$, but conceived so as to obtain a resistance $r$ which would be practically negligible when compared to the resistance R of the reducer.

The resistance R of the reducer is obtained by adding together two resistances:
a. the ohmic resistance of the ionized gas;
b. the resistance obtained from the condensers of the reducer.

Let us suppose, for example, that the reducer was conceived in order that under a voltage of 100,000 v., it would receive a current of 1 milliampere.

According to Ohm's law, the resistance R of the reducer must be:

$$R = \frac{\text{voltage}}{\text{current}} = \frac{100,000 \text{ v.}}{1 \text{ milliampere}} = 100,000,000 \text{ ohms}$$

We may foresee a small tube $t$ working only below 100 v. Thus the electrical resistance $r$ will be:

$$r = \frac{\text{voltage}}{\text{current}} = \frac{100,000 \text{ v.}}{1 \text{ milliampere}} = 100,000 \text{ ohms}$$

This electrical resistance will also be practically negligible with regard to the resistance R of the reducer 100,000,000 ohms.

V being the high tension to be measured and V' the potential difference across the small tube, the current passing through the device is given by Ohm's law:

$$V = RI$$

And according to the same law, the potential difference across the small tube is:

$$V' = rI$$

We can write:

$$\frac{V}{V'} = \frac{RI}{rI} = \frac{R}{r}$$

If the temperature outside the walls of the tubes varies, the resistance of the large tube R will also vary along with the resistance of the small tube $r$, which will rise or fall proportionally.

The potential difference across the small tube V' is also in proportion with the tension to be measured:

$$\frac{V}{V'} = K \text{ (constant)}$$

The measuring apparatus connected to the poles of the small tube $t$ must always have a very high impedance. As an example, FIG. 4 shows a way to measure the voltage.

We may, for this purpose, insert a transformer T between the ground wire and the reducer (see the diagram of the whole apparatus, FIG. 4). The voltage is delivered by the transformer to a measuring apparatus M through rectifiers R—standard connection. In order to improve the accuracy of the reading, we may use bias voltage B, regulated by a potentiometer P. We may thus set the zero of the measuring apparatus too the desired value.

For example, we show on our diagram a measuring apparatus with the following graduations: 0.8—1—1.2—1 represents the normal voltage to be measured, i.e. 100,000 to 1,000,000 v. This purely arbitrary scale may be changed at will by potentiometer P in order to obtain the desired scale.

As an example, the drawing shows four different designs of the tension reducer. These may be modified at will, according to the requirements.

For average voltage of 20,000 v., we put a single tube into operation (FIG. 1) with an electrode E at one end and a capacitive collar C at the other end. This capacitive collar serves simultaneously as a second shielding to the condenser.

The tube was tested under a voltage of 10,000 to 20,000 v. For that we used:

A very strong and heat-resistant glass tube of 20 mm.
An electrode of a standard commercial type
Gas mixture: 75 percent Argon, 25percent Neon
Pressure: 6 mm. of mercury (Hg).
Width of the capacitive collar: approx. 50 mm.

PRACTICAL USE OF THE APPARATUS

Total protection is ensured by the tension reducer of the invention, since the current is completely cut off in the event of failure of the device.

In their majority, tension reducers are equipped with condensers. When the dielectric of one of the condensers is obliterated by the tension, it is carbonized. As a result, a short circuit occurs and a severe damage is caused to the whole installation.

The proposed device cancels such damages. In the event of a short circuit, even a minor one, the ionized gas leaks out of the tube, the conductive surface of the condenser disappears and the current is automatically cut off.

The tension reducer of the invention can replace the standard resistors of a measuring apparatus.

For voltage of the order of 20,000 v., the tension reducer may be fitted inside the case containing the measuring apparatus.

It is rather difficult to show a drawing on behalf of the tremendous variety of measuring apparatuses comprising standard, agglomerated, printed or coiled resistors.

For high voltage measurements, the tension reducer can be removable from the case and used remote from the apparatus, as shown on FIG. 5.

The diagram shows a tension measuring device used to test the voltage of transmission lines. A tube or pole T carries a tension reducer CR and is equipped with a metallic hook connected to one end of tension reducer CR and adapted to connect reducer CR to a high voltage wire. The opposite end of the reducer CR is adapted to be connected to the ground by means of a voltage measuring apparatus M, thus ensuring perfect safety.

The capacitive collars C can be made of a coat of metallized paint or an amalgam of mercury, and covered with another coat of insulating and waterproof paint.

I claim:

1. A resistor capacitor unit comprising two separate closed tube sections made of dielectric material in substantial alignment with their proximate ends spaced from each other, each tube section filled with ionizable gas and further including a wider tube into which the proximate ends of said tube sections extend, said wider tube made of dielectric material and secured to said tube sections in fluidtight manner and filled with ionizable gas, electrically conducting collars fitted around the outer ends of the respective tube sections, whereby when said collars are connected to high tension source, said gas becomes ionized and forms conductive surfaces of capacitor elements, first and second capacitor elements being formed with tube walls as dielectric, the respective collars as a first capacitor plate and the portion of the ionized gas opposite said respective collars as the second capacitor plate, and third and fourth capacitor elements being formed at said proximate ends of said tube sections by the walls of said tube sections as dielectric and by the portions of the ionized gas on each side of said walls forming conductive surfaces or capacitor plates for said capacitor elements, said ionized gas forming resistive paths between the four capacitor elements, the unit forming series-connected capacitor and resistor elements.

2. A resistor capacitor unit comprising a first closed tube made of insulating material and containing ionizable gas, two short tubes made of dielectric material, closed at one end and wider than said first tube, surrounding the respective end portions of said first tube and secured to the latter in fluid-tight manner to define two closed chambers, each filled with ionizable gas, a conductive collar surrounding each short tube and each defining an external electrode, whereby when said electrodes are connected to a high tension source, the gas in the first tube and in the two closed chambers become ionized and forms conductive surfaces of four capacitor elements, the walls of the tubes forming the dielectric of said capacitor elements, said collars forming one conductive surface of two of said capacitor elements and said ionized gas forming the other conductive surfaces of said two capacitor elements and the two conductive surfaces of each of the other two capacitor elements, said ionized gas forming resistive paths between successive capacitor elements, whereby said unit forms series-connected alternating capacitor and resistor elements.

3. A tension reducer as claimed in claim 2, wherein said first tube contains discrete particles of insulating material to produce increased resistivity.